United States Patent

[11] 3,620,281

[72] Inventors Kazuaki Hasegawa;
Kanzo Kawaguchi Nozaki; Katsuyoshi Yokoyama, all of Tokyo, Japan
[21] Appl. No. 889,119
[22] Filed Dec. 30, 1969
[45] Patented Nov. 16, 1971
[73] Assignee Japan Bicycle Promotion Institute Tokyo, Japan
[32] Priority Apr. 21, 1969
[33] Japan
[31] 44/35778

[54] SIMULTANEOUS FASTENING APPARATUS FOR WIRE SPOKE WHEELS
4 Claims, 8 Drawing Figs.

[52] U.S. Cl. ...................................................... 157/1.55
[51] Int. Cl. ...................................................... B60b 1/04
[50] Field of Search ........................................... 157/1.5

[56] References Cited
UNITED STATES PATENTS

| | | | |
|---|---|---|---|
| 1,944,596 | 1/1934 | Farr et al. | 157/1.5 X |
| 1,980,129 | 11/1934 | Eksergian et al. | 157/1.5 UX |
| 2,607,402 | 8/1952 | Meydrech | 157/1.5 |
| 2,759,530 | 8/1956 | Herr | 157/1.5 |

Primary Examiner—Granville Y. Custer, Jr.
Attorney—Wenderoth, Lind & Ponack

ABSTRACT: A simultaneous fastening apparatus for wire spoke wheels comprises a fixed lower assembly having a ring-shaped spoke inserting part provided with slots into which the spokes of a provisionally assembled wheel are inserted and vertical teeth between the slots, an annular rim-loading part on which the rim of said wheel is loaded, and an axle-supporting part for gripping the lower end of an axle of said wheel, said rim-loading part being disposed beneath the outer periphery of said spoke-inserting part, and said axle-supporting part being disposed beneath the center of said rim-loading part and said spoke-inserting part. An upper assembly movable in the vertical direction has an annular rim-clamping part provided with a tapered surface along the lower portion of its outer periphery for making contact with the rim of said wheel and a vertical guide surface along the lower portion of its inner periphery for making contact with the outer periphery of said teeth, and an axle-supporting part for gripping the upper end of the axle of said wheel, said supporting part being disposed at the center of said clamping part. Driver devices equal to the number of nipples threadedly mated with the tips of the respective spokes of the wheel are positioned to oppose each of the slats of said lower assembly at its outer peripheral position and are reciprocable in the directions of the spokes of the wheel. First driving means are positioned for reciprocating the upper assembly in the vertical direction; second driving means are positioned for rotating the driver devices in the fastening direction of the nipples with a constant torque; and third driving means are positioned for reciprocating the driver devices in the directions of the spokes.

PATENTED NOV 16 1971     3,620,281
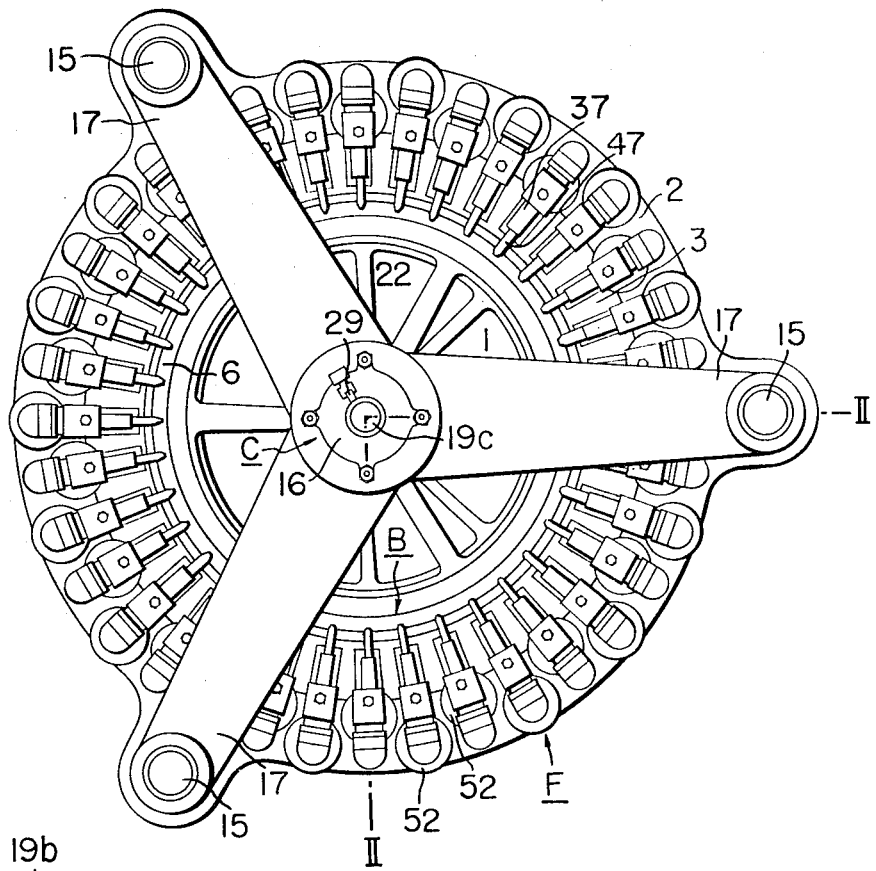
FIG. 1
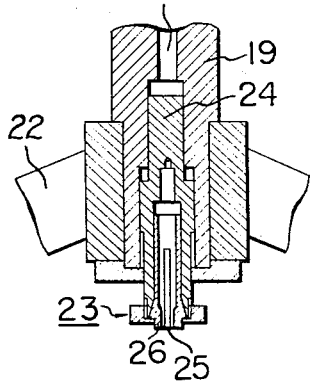
FIG. 3
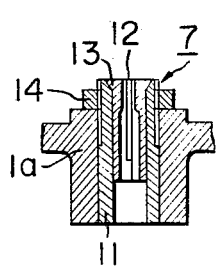
KAZUAKI HASEGAWA,
KANZO NOZAKI and
KATSUYOSHI YOKOYAMA,
INVENTORS
BY Wendeworth, Lind & Ponack
ATTORNEYS

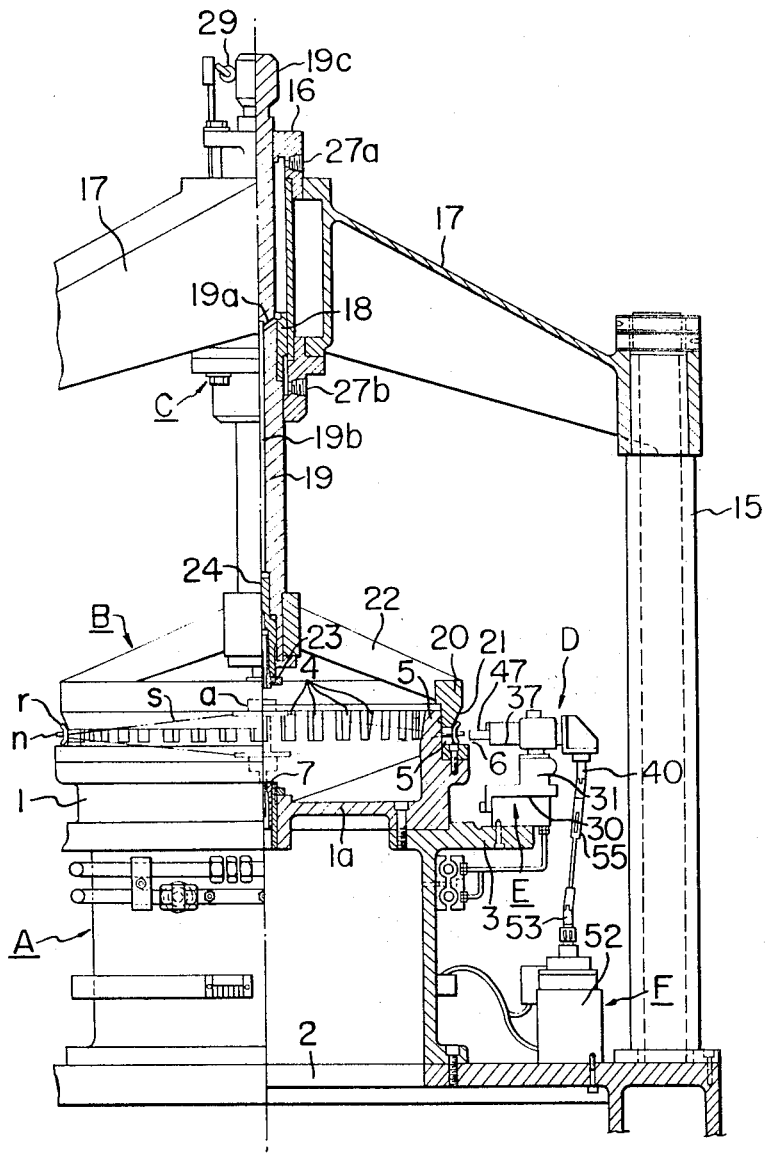
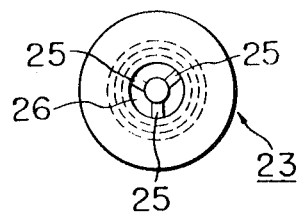
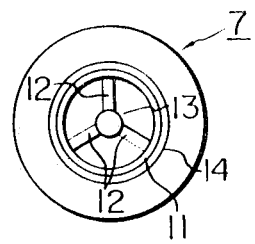

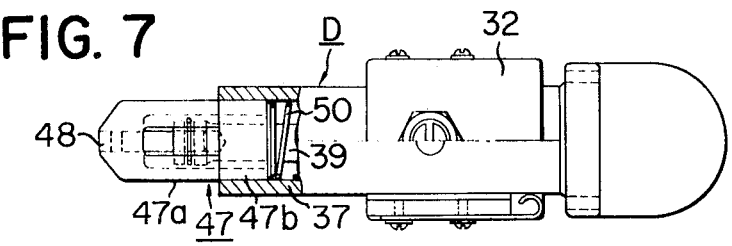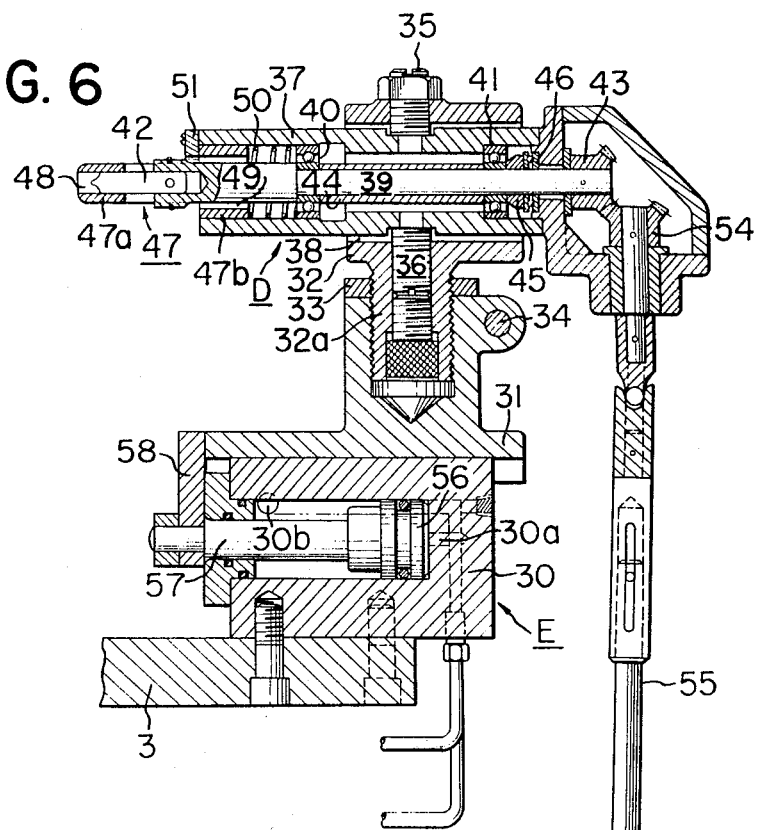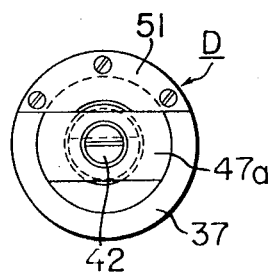

SIMULTANEOUS FASTENING APPARATUS FOR WIRE SPOKE WHEELS

The present invention relates to a simultaneous fastening apparatus for finally assembling a wire spoke wheel which consists of a plurality of spokes, a hub, and a rim.

The wire spoke wheel used in a bicycle or the like, consists of a centrally located hub, a rim positioned along its outer periphery, and a plurality of wire spokes interconnecting the hub and the rim together. Upon assembling these parts in a factory, it is required that while the hub is set at the center position of the rim, the wire spokes having one of their ends anchored to said hub are interlaced with one another and simultaneously the other ends of said wire spokes are respectively positioned in the spoke holes on the rim, and then nipples are threadedly mated with these end portions in a loose manner to provisionally assemble the hub, rim, and wire spokes. Such a provisionally assembled wheel is then sent to a main fastening process, where said nipples threadedly mated with said other ends of the wire spokes are finally fastened to integrally couple the hub, the rim and the plurality of wire spokes.

Thus two processes are necessary before a wire spoke wheel has been completely assembled. With regard to the latter main fastening process, an automatic apparatus has been heretofore used which comprises a device for simultaneously fastening four of the nipples which are provisionally retained on the respective spokes. When there are 36 spokes, such apparatus requires nine separate fastening operations before the fastening of all the nipples has been completed.

Accordingly, in using such apparatus, a great amount of time was required before one complete wheel could be finally fastened, and thus there was the disadvantage that the efficiency of the operation was low, resulting in increased manufacturing costs.

The present invention has been proposed in view of the above-mentioned background of the art, and a principal object of the present invention is the provision of a novel simultaneous fastening apparatus for wire spoke wheels, which is made simple in structure by carrying out clamping of the rim as well as the relative approach of the two axle-supporting parts by means of a single cylinder.

Another object of the present invention is the provision of a novel simultaneous fastening apparatus for wire spoke wheels, in which a rim-loading part of a lower assembly is formed of various kinds of annular bodies which are different in height and freely replaceable, thus making it possible to bring the centers of the rim openings in the proximity of the axes of the driver shafts by selectively choosing among the annular bodies, even if the widths of the rims of the wheels to be fastened vary, and in which the outer circumferential surface of the rim-clamping portion of the upper assembly is formed as a steeply sloped surface that becomes smaller in diameter towards its lower end so as to be inserted into the inside of the rim in a wedgelike manner, whereby any rim may be removed of its strain in the circumferential direction and made the shape of a true circle.

Still another object of the present invention is the provision of a novel simultaneous fastening apparatus for wire spoke wheels, in which supporting means for the driver shaft is constructed of a pair of upper and lower bolts and inner and outer metallic supporting cylinders, and the height of said driver shaft can be subjected to fine adjustment by turning said pair of upper and lower bolts in either the normal or opposite directions, whereby the axes of said driver shafts can be completely aligned with each other in the horizontal direction, and also said supporting means can not be damaged, even if used for a long period of time, because it is made of metal as described above.

Yet another object of the present invention is the provision of a novel simultaneous fastening apparatus for wire spoke wheels, in which a simplified safety device is constructed of an electromagnetic valve and a limit switch.

In order to achieve the aforementioned respective objects, the present invention is characterized in that said simultaneous fastening apparatus comprises a fixed lower assembly having a ring-shaped spoke-inserting part provided with slots into which the spokes of a provisionally assembled wheel are inserted and vertical teeth formed between the slots, an annular rim-loading part on which the rim of said wheel is loaded, and an axle-supporting part for gripping the lower end of an axle of said wheel. The rim-loading part is disposed beneath the outer periphery of the spoke-inserting part, and the axle-supporting part is disposed beneath the center of the rim-loading part and the spoke-inserting part. An upper assembly, movable in the vertical direction has an annular rim-clamping part provided with a tapered surface along the lower portion of its outer periphery for making contact with the rim of the wheel loaded on the rim-loading part and a vertical guide surface along the lower portion of its inner periphery for making contact with the outer periphery of the teeth, and an axle-supporting part for gripping the upper end of the axle of the wheel the supporting part is disposed at the center of the clamping part. Driver devices, equaling the number of nipples threadedly mated with the tips of the respective spokes of the wheel, each oppose one of the slots of the lower assembly at the outer peripheral position thereof and reciprocate in the direction of the spokes of the wheel. A first driving means is positioned for reciprocating the upper assembly in the vertical direction; a second driving means is positioned for rotating each driver device to fasten the nipples with a constant torque; and a third driving means is positioned for reciprocating the driver devices in the directions of the spokes.

Due to the fact that in the apparatus according to the present invention, the number of driver devices equal the number of nipples threadedly mated with the tips of the respective spokes of the provisionally assembled wheel and each driver device is opposed to a slot of the lower assembly and is free to reciprocate in the direction of the spoke of the wheel; when the driver devices are operated by the second driving means, all the nipples on the provisionally assembled wheel clamped between the upper and lower assemblies are simultaneously fastened. Thus the operation efficiency can be extremely enhanced in comparison with prior art apparatus in which the same operation must be repeated many times.

In addition, due to the fact that the simultaneous apparatus according to the present invention includes an assembly movable in the vertical direction and having an annular rim-clamping part provided with a tapered surface along the lower portion of its outer periphery for making contact with the rim of the wheel, a vertical guide surface along the lower portion of its inner periphery for making contact with the outer periphery of the teeth, and an axle supporting part for gripping the upper end of the axle of the wheel, after the provisionally assembled wheel has been placed on the lower assembly with the spokes inserted into the respective slots with the lower end of the axle inserted into the axle-supporting part and the rim loaded on the rim-loading part, when the first driving means is actuated to lower the upper assembly, that is, the rim-clamping part and the axle-supporting part, then the tapered surface provided along the lower portion of the outer periphery of the clamping part cooperates with the rim-loading part of the lower assembly so as to clamp the rim in an exactly circular shape. In addition, the axle-supporting part of the upper assembly cooperates with the axle-supporting part of the lower assembly so as to grip the upper and lower end portions of the axle, whereby the rim and the axle are completely affixed. Also, when the vertical inner peripheral surface of the rim-clamping part and the vertical outer surface of the teeth of the lower assembly make contact with each other, a perfect alignment of the axes of the respective axle-supporting parts results, and the entire rim-clamping part becomes perpendicular to these axes, whereby the rim and the axle can occupy their regular positions when affixed. Further, when the second and third driving means are actuated, the driver devices move forwardly to engage with the nipples and rotate them with a constant torque, so that the respective nipples may be threaded equally. Since the rim and the axle can be set at their regular positions and the respective nipples can be equally threaded it is possible to fasten the provisionally assembled wheel accurately, thereby greatly reducing operational longitudinal and lateral vibrations.

Still further, according to the present invention, since the positioning of the rim and axle as well as the fastening of the nipples are carried out automatically and the operator is required only to load the provisionally assembled wheel on the lower assembly and to remove the finally fastened wheel from the lower assembly, an advantageous feature results in that the operational procedure is simplified and thus a relatively inexperienced operator can easily operate the apparatus.

Other features and advantages of the invention will become more apparent from the following description of a preferred embodiment taken in conjunction with the accompanying drawings, in which:

FIG. 1 is a plan view showing a preferred embodiment of the simultaneous fastening apparatus for wire spoke wheels according to the present invention, FIG. 2 is a side view showing a longitudinal cross section taken along line II—II in FIG. 1, FIG. 3 is a longitudinal cross section side view showing an axle-supporting part provided in the upper and lower assemblies in an enlarged scale, FIG. 4 is a bottom view of the axle-supporting part provided in the upper assembly, FIG. 5 is a plan view of the axle-supporting part provided in the lower assembly, FIG. 6 is a longitudinal cross section side view showing a driver device and driving means therefor, FIG. 7 is a plan view of said driver device, and FIG. 8 is a front view showing the tip portion of said driver device.

The present invention will be described in more detail hereinafter with reference to the preferred embodiment illustrated in FIGS. 1 to 8. The entire apparatus consists of a lower assembly A, an upper assembly B, first driving means C for said upper assembly, driver devices D, and second and third driving means E, F for said driver devices.

At first, description will be made with reference to the lower assembly A. Reference numeral 1 indicates a supporting frame formed in a short cylindrical shape and having a diameter which is somewhat smaller than the diameter of a rim $r$, and numeral 2 indicates a base stand having an outwardly projecting flangelike mounting table 3, said frame body 1 being fixedly secured to the top of said base stand 2. Numeral 4 indicates slots provided at equal intervals at the top of said frame body 1, the number of which is equal to the number of spokes $s$, that is, equal to 36 in the case of the illustrated apparatus. Numeral 5 indicates teeth formed between the slots, and the number of the teeth is equal to that of said slots 4. Their respective outer peripheral surfaces are cut out precisely in the vertical direction. The supporting frame 1 is formed in a cylindrical shape, whereby when the slots and teeth are formed as described above, the surface connecting the outer peripheral surfaces of the respective teeth 5 coincides with one imaginary cylindrical surface centered at the axis of the supporting frame 1. Numeral 6 indicates an annular rim-loading part disposed along the outer peripheral surface of the supporting frame 1 beneath said slots 4 and said teeth 5, and numeral 7 indicates an axle-supporting part disposed at the center of the bottom portion 1a of the supporting frame 1. In the case of the illustrated embodiment, a collet chuck as shown in FIGS. 3 and 5 is used in the axle-supporting part 7. Explaining this collet chuck with reference to FIGS. 3 and 5, it consists of an outer cylinder 11 having its inner surface flared at the top and adapted to be threadedly mated with said bottom portion 1a, and an inner cylinder 13 adapted to be fitted into said outer cylinder and having its outer surface flared at the top and provided with longitudinal split slots 12. When the lower end of the axle $a$ is depressed into the inner cylinder 13 through an operation as described later, said inner cylinder 13 also shifts downwardly to a certain extent within the outer cylinder 11 together with the axle $a$, so that the upper portion of the inner cylinder 13 is contracted to grip the lower end portion of the axle $a$. If this depressing force is released, the upper portion of the inner cylinder 13 which has been contracted, will expand by its own resilient force, and will release the gripped lower end of the axle $a$ as it moves upwardly within the outer cylinder 11. Since the axle-supporting part 7 may be shifted as a whole in the vertical direction by loosening a nut 14 and turning the outer cylinder 11, the mounting position is adjustable.

Now description will be made of the upper assembly B and the first driving means therefor. Numeral 15 indicates three struts studded at three symmetrical positions along the circumference of said base stand 2, numeral 16 indicates a hydraulic cylinder disposed above said axle-supporting part 7, and these struts 15 and hydraulic cylinder 16 are integrally coupled by means of three beam members 17. Numeral 18 indicates a piston of said hydraulic cylinder 16, and numeral 19 indicates a piston rod integrally coupled to said piston 18, having its axis aligned with the axis of said supporting frame 1 and its lower end positioned above said axle-supporting part 7. Numeral 20 indicates an annular rim-clamping part, the inner peripheral surface of which is slidable along the outer peripheral surface of said teeth 5, and on the lower portion along the outer peripheral surface of said rim-clamping part is provided a tapered portion 21 which makes contact with the upper inner periphery of the rim $r$ when it is loaded on said rim-loading part 6, that is, a tapered portion 21 having its outer diameter reduced downwardly. Said rim-clamping part 20 and said piston rod 19 are integrally coupled by means of a plurality of arms 22. Numeral 23 indicates another axle-supporting part mounted at the lower end of said piston rod 19. A collet chuck (as shown in FIGS. 3 and 4) consists of a piston 24 which is movable in the vertical direction along the axis of said piston rod 19, and an inner cylinder 26 which has split slots 25 and is movable in the vertical direction along said axis within said piston 24. The vertical movement of said piston and said inner cylinder 26 is carried out in relation to the vertical movement of said piston 18, said piston rod 19 and said rim-clamping part 20. When a pushbutton switch, not shown, is depressed to shift an electromagnetic valve to one position and thereby pressurized oil from a hydraulic pump (not shown) is fed to an inlet port 27a provided at the upper end of said cylinder 16, the pressurized oil is passed through an oil path 19a to an oil path 19b, resulting in a predetermined amount of descent of the piston 24. Then also the piston 18, piston rod 19 and rim-clamping part 20 begin to descend, and from the midway of the descent the rim-clamping part 20 lowers along the vertical outer periphery of the respective teeth 5 until the tapered portion 21 of the rim-clamping part 20 is inserted along the upper inner periphery of the rim $r$ in a wedgelike manner and thus clamps the rim $r$ in an exactly circular shape. Also at this step of operation, the lower end of the inner cylinder 26 abuts against the upper end of the axle $a$ and thereby allows the upper end portion of the axle $a$ to enter the inner cylinder to a certain extent, and simultaneously the entire axle $a$ is depressed downwardly, so that in said axle-supporting part 7 the aforementioned operation is carried out, and in said axle-supporting part 23 the inner cylinder 26 retreats upwardly to a certain extent due to the reaction force, resulting in contraction of the lower end portion of the inner cylinder 26 to grip the upper end of axle $a$. In addition, in order to avert the danger upon descent, said upper assembly B is provided with the following means. That is, said pushbutton switch, not shown, is provided in duplicate, and unless these switches are depressed together by means of the both hands, said oil path switching electromagnetic valve, not shown, cannot be shifted to said one position, and consequently, the oil path extending from a hydraulic motor to the inlet port 27a of the cylinder 26 cannot be opened. When the rim-clamping part 20 has completed its descent as described above and allows a microswitch 29 to make contact with an enlarged diameter portion 19c of the piston rod 19, the electromagnetic valve is maintained to said one position, whereby the pressured oil is continuously fed to the inlet port 27a. Therefore, prior to attainment of the above-mentioned state, if either one or both hands are removed from the pushbutton switch, then the electromagnetic valve will automatically return to the other position to feed the pressured oil to the other inlet port 27b of the cylinder 16, resulting in automatic ascent of the upper assembly B, and therefore, there is no risk that the operator may have his hands clamped between the lower assembly A or the rim r and the rim-clamping part 20. In the illustrated apparatus, the axle-supporting part 23 including the lower portion of the piston rod 19, the arms 22 and the rim-clamping part 20 in combination correspond to said upper assembly B, while the piston rod 19, the piston 18 and the cylinder 16 correspond to said first driving means C for said upper assembly B.

Now description will be given with respect to the driver devices D and the second and third driving means E and F. Numeral 30 indicates a hydraulic cylinder fixedly secured to said mounting table 3. As many cylinders 30 are provided as there are spokes s (in the case of the illustrated apparatus, 36). Numeral 31 indicates a support bracket slidably mounted at the top of said respective cylinders 30, and to the lower end of said support bracket 31 is fixedly secured a piston rod 57. The directions of sliding motion of these support brackets 31 are the radial directions of the supporting frame 1, each passing through the center of the corresponding slot 4. Numeral 32 indicates a support outer cylinder having its lower portion 32a inserted into said support bracket 31 and fixed in position by means of a nut 33 and a clamping bolt 34, and from its upper and lower sides towards its inside are projected the tips of bolts 35 and 36. Numeral 37 indicates a support inner cylinder having an outer diameter smaller than the inner diameter of said support outer cylinder 32, its rear half portion being positioned within the support outer cylinder 32, and the upper and lower sides of the center portion are rotatably supported by means of said bolts 35 and 36. Therefore, the support inner cylinder 37 is rotatable in a horizontal plane within the limited swing allowed by the clearance between the two cylinders. In addition, if a gap is provided between the tip portions of bolts 35, 36 and the support inner cylinder 37, then the support inner cylinder 37 also is rotatable in vertical and/or oblique directions and thus the nipple-catching operation as described later is facilitated. Numeral 39 indicates a driver shaft which is supported within the support inner cylinder 37 by means of bearings 40, 41 so as to inhibit the shift of its axial direction. At one end of the driver shaft is mounted a driver 42 and at the other end is fixedly secured a bevel gear 43. Numerals 44, 45 indicate spacers, and numeral 46 indicates a thrust bearing. Numeral 47 indicates a metallic member for holding the head of the nipple n, and includes a flat front portion 47a and a cylindrical rear portion 47b, the front portion 47a is provided with an opening having a diameter somewhat larger than that of the head of the nipple and the rear portion 47b being provided with an opening 49 having a diameter somewhat larger than that of said driver shaft 39. Rear portion 47b is fitted into the space between said support inner cylinder 37 and driver shaft 39, and between said rear portion 47b and said bearing 40 is inserted a spring 50. Therefore, metallic member 47 is normally pushed forward until the rear portion 47b bears against a stopper 51 which is fixedly secured to the tip of the support inner cylinder 37. Numeral 52 indicates torque motors mounted on base stand 2. One torque motor is provided for each nipple n (in the illustrated apparatus 36), and are automatically stopped when a predetermined maximum load is applied, and automatically restarted when the load is removed. The rotational torque required for fastening the nipple can be obtained by adjusting the output voltage of a slide transformer. Numeral 53 indicates an output shaft of one torque motor 52, and is coupled with driver shaft 39 by the intermediary of a bevel gear 54 which meshes with bevel gear 43 and a flexible coupling shaft 55. In the illustrated apparatus, the driver 42, the driver shaft 39, the inner and outer support cylinders 37 and 32, respectively, the metallic member 47, etc. correspond to said driver devices D; the hydraulic cylinder 30, the support bracket 31, and the piston rod 57, etc. correspond to said second driving means E; and the torque motor 52, the coupling shaft 55, etc. correspond to said third driving means F.

In operation of the illustrated fastening apparatus, at first, the hydraulic pump (not shown) for feeding pressurized oil to the cylinders 16 and 30 and the torque motor 52 are made to be ready for starting. Then a provisionally assembled wheel consisting of an axle a, spokes s, and a rim r and nipples n, is placed on the lower assembly A. At this time, the lower end of the axle a is put on the axle-supporting portion 7, the rim r is placed on the rim-loading part 6, and the respective spokes s are inserted into the corresponding slots 4. Then the two pushbutton switches are depressed together to shift the electromagnetic valve to said one position and thus feed the pressured oil from said hydraulic pump to the inlet port 27a of the cylinder 16. As a result, the piston 24 descends for a predetermined distance, and as the entire upper assembly B continues to descend, the inner peripheral surface of the rim-clamping part 20 makes contact with the outer peripheral surface of the teeth 5, and finally the tapered portion 21 is fitted along the upper inner periphery of the rim r in a wedgelike manner to clamp the rim r in an exactly circular shape together with the rim-loading part 6. Also, simultaneously therewith, the inner cylinder 26 of the axle-supporting part 23 abuts against the upper end of the axle a to allow the axle a to enter the inner cylinder 26, and simultaneously depresses the axle a downwardly to insert the lower end of the axle a into the inner cylinder 13. In this way, the rim r and the axle a are fixed in position, and since the enlarged diameter portion 19c of the piston rod 19 then makes contact with the microswitch 29 and thus it operates, said electromagnetic valve will maintain said one position. Therefore, even if the both hands are removed from said switch, the upper assembly B will not ascend and the relationship between the rim r and the axle a is maintained. Then, another pushbutton switch separate from said two pushbutton switches is depressed to shift another electromagnetic valve to a position to feed pressurized oil from said hydraulic pump to inlet ports 30a of the respective cylinders 30. As a result, the piston rods 57 advance, and each rotating driver shaft 39 is advanced towards each nipple n of the provisionally assembled wheel by the intermediary of the support bracket 31 and the inner and outer support cylinders 37 and 32, respectively. Due to this advancement, at first the flat portion 47a of the metallic member 47 arrives at the position of the nipple n and encompasses the head of the nipple within the opening 48. But in the next step, since the flat portion 47a abuts against the rim r, the metallic member 47 is unable to advance further. However, the driver shaft 39 still continues to advance by the intermediary of the support bracket 31 and the inner and outer support cylinders 37 and 32, respectively. Thus the tip of the driver shaft 39 engages the slot on the nipple n to rotate the nipple n encompassed within said opening 48 in the thread-in direction for fastening the same. In this connection, since a piston 56 which is integrally coupled to the piston rod 57 has not yet abutted against an end plate 58, the driver shaft 39 continues to be advanced. When the fastening of the nipple proceeds and the load has reached a predetermined value, the respective torque motors 52 stop rotation automatically.

Also under such a condition, a timer (not shown) is actuated to shift said two electromagnetic valves to the other positions, respectively. Accordingly, pressurized oil is fed to the inlet port 27b in the region of the cylinder 16, and to the inlet port 30b in the region of the cylinder 30, and thus the upper assembly B ascends and the driver devices D retreat to their home positions, respectively. In addition, when the upper assembly B begins to ascend as described above, the feed of the pressurized oil to the piston 24 is stopped, so that the inner cylinder 26 moves downwardly to a certain extent and the inner cylinder 13 moves upwardly to a certain extent due to their own resilient force, and thereby their tip portions are expanded into the original shape. Consequently, the axle $a$ is released. Also when the driver devices begin to retreat as described above, the tip of each driver shaft 39 is disengaged from each nipple $n$, so that the torque motor 52 and the driver shaft 39 may again start rotation. This rotation continues without interruption during the period when the driver shaft 39 retreats to its home position and later again advances for fastening the nipple as described above.

As described, by actuating cylinder 16, the gripping of the upper and lower ends of the axle as well as the clamping of the rim may be achieved simultaneously. Since only one cylinder is needed to operate this apparatus, the structure thereof is simplified.

In addition, inasmuch as the driver shaft 39 is supported in such manner that it can be swiveled along a horizontal plane about the bolts 35 and 36 and also that adjustment in the vertical direction may be achieved by rotating said bolts 35 and 36, it is possible to accurately align the axes of the nipples and the spokes and the axes of the driver shafts 39, and thereby the capturing and fastening of the nipples may be achieved smoothly.

Still further, the rim-loading part 6 is freely attached to or detached from the lower assembly A. Thus, by choosing a suitable one among a number of rim-loading parts 6 having different heights, it is possible to bring the center of the rim opening in the proximity of the axis of the driver shaft. In other words, according to the present invention, with the replacement of the rim-loading parts 6 and the fine adjustment by means of the bolts 35 and 36, the axes of the nipples and the spokes and the axes of the driver shafts 39 can be completely aligned. In addition, due to the fact that the outer circumferential surface of the rim-clamping part 20 is provided with a steeply tapered portion 21 having a larger diameter at its upper end than the outer diameter of the rim and a smaller diameter at its lower end than the inner diameter of the rim, and said tapered portion 21 is adapted to be inserted into the inside of the rim placed on the rim-loading part 6 in a wedgelike manner; even if the rim should have a strain in the circumferential direction, the rim will be formed into a true circle, whereby the wheel after fastened will not cause vertical vibration upon rolling.

Also, the structure of the apparatus according to the present invention is simpler, because the oil path on the side of the inlet 27a of said cylinder 16 is controlled by the electromagnetic valve which is closed when the pushbutton switch is released, and because when the upper assembly B has been fully lowered the microswitch 29 is actuated by the larger diameter part 19c provided at the top of the piston rod 19, said electromagnetic valve remains in the opened position and thereby the feeding of pressurized oil from the inlet 27a to the cylinder 16 may be continued.

While the present invention has been described above with reference to a preferred embodiment, it is intended that the present invention should not be limited only to the embodiment, but various changes in design could be made within the scope of the invention without departing from the spirit of the invention.

What is claimed is:

1. An apparatus for simultaneously fastening the spokes of a wire spoke wheel, said apparatus comprising a lower assembly fixed in position and including an annular spoke inserting part having slots therein into which the spokes of a provisionally assembled wheel may be inserted and vertical teeth between said slots, an annular rim-loading means positioned outwardly and below said spoke-inserting part for supporting the rim of said provisionally assembled wheel, and a lower axle-supporting means positioned centrally of said spoke-inserting part and said rim-loading means and including a first collet chuck for gripping the lower portion of the axle of said provisionally assembled wheel; an upper assembly mounted for vertical movement toward and away from said lower assembly and including an upper axle supporting means, the vertical axis of which corresponds to the vertical axis of said lower axle-supporting means and including a second collet chuck for gripping the upper portion of the axle of said provisionally assembled wheel, said second collet chuck including an internally mounted piston vertically movable with respect to said upper axle-supporting means, and an annular rim-clamping means positioned coaxially without said upper axle-supporting means and having an inner vertical peripheral surface dimensioned to be guided by the outer surfaces of said teeth when said upper assembly is moved toward said lower assembly for gripping said rim-supported on said rim-loading means; first means for driving said upper assembly in said vertical movement and including a fixed cylinder mounted above said upper assembly, the axis of said fixed cylinder corresponding to said axis of said upper and lower axle-supporting means, a piston rod mounted for vertical movement within said fixed cylinder, the lower end of said piston rod forming a portion of said upper axle-supporting means, said piston of said second collet chuck being vertically movable within said lower end of said piston rod, a flow passage within said piston rod communicating from the interior of said fixed cylinder to the top of said piston, first fluid supply means for supplying fluid to said fixed cylinder for lowering said piston rod with respect to said fixed cylinder and lowering said piston with respect to said piston rod, and second fluid supply means for supplying fluid to said fixed cylinder for raising said piston rod and said piston; a plurality of driver means, one of said driver means opposing each of said slots, for simultaneously tightening a nipple onto each of said spokes, each of said driver means including an outer support cylinder, an inner support cylinder positioned within said outer support cylinder, and a rotatable driver shaft mounted within said inner support cylinder, the outer end of said driver shaft having thereon means for engaging said nipple; a plurality of second means mounted for driving each of said driver means in the axial direction of their respective spokes; and a plurality of third means mounted for rotating each of said driver shafts of said driver means.

2. An apparatus as claimed in claim 1, wherein each of said driver means further comprises a pair of bolts vertically mounting said inner support cylinder within said outer support member, said inner support member thereby being limitingly rotatable in a horizontal plane around said bolts, said bolts being vertically movable whereby the vertical position of said inner support cylinder with respect to said outer support cylinder is adjustable.

3. An apparatus as claimed in claim 1, wherein said rim-loading means is detachably mounted on said lower assembly and has a horizontal rim-loading surface; and said rim-clamping means has a steeply tapered outer circumferential surface such that the outer diameter at its upper end is greater than the outer diameter of said rim, and the outer diameter at its lower end is less than the inner diameter of said rim; whereby when said upper assembly is lowered, said tapered surface is adapted to contact the inner edge of said rim in a wedgelike manner to thereby uniformly expand said rim into a true circle.

4. An apparatus as claimed in claim 1, wherein the upper end of said piston rod extends through said fixed cylinder and has an enlarged portion thereon, and further comprising microswitch means mounted to be opened by said enlarged portion when said upper assembly is fully lowered for maintaining fluid supply to said first fluid supply means.

* * * * *